US 9,557,877 B2

United States Patent
Bull et al.

(10) Patent No.: US 9,557,877 B2
(45) Date of Patent: *Jan. 31, 2017

(54) ADVANCED PLAYLIST CREATION

(71) Applicant: Apple Inc., Cupertino, CA (US)

(72) Inventors: William Bull, Campbell, CA (US); Ben Rottler, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 369 days.

This patent is subject to a terminal disclaimer.

(21) Appl. No.: 14/030,648

(22) Filed: Sep. 18, 2013

(65) Prior Publication Data

US 2014/0095998 A1    Apr. 3, 2014

Related U.S. Application Data (63) Continuation of application No. 12/145,235, filed on Jun. 24, 2008, now Pat. No. 8,560,950.

(60) Provisional application No. 60/969,846, filed on Sep. 4, 2007, provisional application No. 60/969,850, filed on Sep. 4, 2007.

(51) Int. Cl.
  *G06F 3/00*   (2006.01)
  *G06F 3/048*  (2013.01)
  *G06F 17/30*  (2006.01)

(52) U.S. Cl.
  CPC ......... *G06F 3/048* (2013.01); *G06F 17/30749* (2013.01)

(58) Field of Classification Search
  CPC ...... H04L 65/60; H04L 65/4084; H04L 67/02; H04L 67/10; H04L 63/0428; H04L 67/22; H04L 67/306; H04L 65/4076; H04L 65/605; H04L 67/06; H04L 67/1095; H04L 67/26; H04L 12/1485; H04L 2463/101
  USPC ........................................................ 715/716
  See application file for complete search history.

(56) References Cited

U.S. PATENT DOCUMENTS

| | | | |
|---|---|---|---|
| 6,526,411 | B1 | 2/2003 | Ward |
| 6,947,947 | B2 | 9/2005 | Block et al. |
| 6,993,532 | B1 | 1/2006 | Platt et al. |
| 7,565,064 | B2 | 7/2009 | Adolph et al. |

(Continued)

OTHER PUBLICATIONS

Bull, William et al., "Auto-Tagging of Aliases", Advisory Action of Jun. 1, 2011 for U.S. Appl. No. 12/145,258, 3 pages., 3 pages.

(Continued)

*Primary Examiner* — Di Xiao
(74) *Attorney, Agent, or Firm* — Downey Brand LLP (57) ABSTRACT

Media players and associated methods are described that may allow a user to initiate playback of content or other media assets based on information associated with content. A media player may receive information associated with content from a user selection of a song, movie, photo, or the like. Based on the information, the media player may procure other additional content to be added to a playlist. The media player may automatically add to a playlist or modify a playlist with content that matches a user's preferences for artists, albums, genres, or the like. The user may interact with the media player to determine what content is added and how a playlist should be mixed. The user may specify how much of any content procured by the media player should be present in the playlist without the need to specify each individual item that constitutes a playlist.

20 Claims, 6 Drawing Sheets

(56) References Cited

U.S. PATENT DOCUMENTS

| | | |
|---|---|---|
| 2006/0206478 A1 | 9/2006 | Glaser |
| 2006/0212442 A1 | 9/2006 | Conrad et al. |
| 2006/0224260 A1 | 10/2006 | Hicken et al. |
| 2007/0025194 A1* | 2/2007 | Morse ................ G11B 27/034 369/30.1 |
| 2007/0033225 A1 | 2/2007 | Davis |
| 2007/0174866 A1 | 7/2007 | Brown et al. |
| 2007/0208771 A1* | 9/2007 | Platt ................ G06F 17/30038 |
| 2007/0220580 A1* | 9/2007 | Putterman .......... H04N 7/17318 725/134 |
| 2007/0253699 A1 | 11/2007 | Yen et al. |
| 2007/0282908 A1 | 12/2007 | Van der Meulen et al. |
| 2008/0005688 A1* | 1/2008 | Najdenovski ..... G06F 17/30053 715/765 |
| 2008/0115173 A1 | 5/2008 | Ellis et al. |
| 2008/0168070 A1 | 7/2008 | Naphade et al. |
| 2008/0195664 A1 | 8/2008 | Maharajh et al. |
| 2009/0063521 A1 | 3/2009 | Bull et al. |

OTHER PUBLICATIONS

Bull, William et al., "Auto-Tagging of Aliases", Non-Final Office Action of Jun. 28, 2011, U.S. Appl. No. 12/145,258, 24 pages., Mar. 5, 2009, 1-24.

Tunequest, Analysis of an iTunes smart playlist (Mar. 18, 2007). http://www.tunequest.org/genre_contains_rock/.

* cited by examiner

ADVANCED PLAYLIST CREATION

CROSS-REFERENCES TO RELATED APPLICATIONS

This application claims priority to U.S. Non-Provisional application Ser. No. 12/145,235, entitled "ADVANCED PLAYLIST CREATION", filed Jun. 24, 2008, the benefit of U.S. Provisional Application No. 60/969,846, filed Sep. 4, 2007, entitled "ADVANCED PLAYLIST CREATION" and U.S. Provisional Patent Application No. 60/969,850, filed Sep. 4, 2007, entitled "AUTO-TAGGING OF ALIASES", of which the full disclosure of this application are incorporated herein by reference for all purposes.

This application is related to co-pending U.S. patent application Ser. No. 12/145,258, filed Jun. 24, 2008, and entitled "Auto-Tagging of Aliases," the entire disclosure of which is herein incorporated by reference for all purposes.

BACKGROUND OF THE INVENTION

Electronic devices, such as personal computers, laptops, portable media players, cellular phones, personal digital assists (PDAs), and the like, are prevalent in today's marketplace, as are the peripheral electronic devices that support their use, such as docking stations and the like. As competition in the personal electronics marketplace becomes ever more heated, consumers have become more demanding in terms of both the functionality and use of such devices.

One popular function may be the storage and output of content, such as music, images, photos, and movies. Improving compression methods, like MPEG-standards, can result in less storage capacity required making it more convenient to store tens of thousands of songs and photos, and several full-length DVD quality movies. Moreover, distribution via the Internet can make it easier to obtain multimedia content.

In general, navigating through all of the content stored on a device, such as a media player, can be difficult when the media player is loaded with content from different artists, albums, and genres. Typically, a playlist may allow a user to consume content in a sequence or predetermined manner. In its most general form, a playlist may simply be a list of songs. Additionally, the playlist may be used to order a list of songs played during a given time period. A playlist can be defined, stored, and selected to run either in sequence or, if a random playlist function is selected, in a random order. The playlists' uses may include allowing a particular desired musical atmosphere to be created and maintained without constant user interaction, or to allow a variety of different styles of music be played, again without maintenance.

However, a user typically creates the playlist by adding songs one by one, or by getting the playlist from another user that created the playlist. This process can become tedious if there are thousands of songs to choose from.

Accordingly, what is desired is to solve problems relating to the playback of content or other media assets using electronic devices, some of which may be discussed herein. Additionally, what is desired is to reduce drawbacks related to the playback of content or other media assets using electronic devices, some of which may be discussed herein.

BRIEF SUMMARY OF THE INVENTION

The present invention relates generally to media players. More particularly, to techniques for advanced playlist creation.

In various embodiments, an electronic device, such as a media player or portable media device, can include features for automatically generating playlists. A user may interact with the media player to select content. Based on information associated with the content, the media player may determine or otherwise obtain additional content to be automatically added to playlists. One or more playlists can be generated based on the automatically determined content.

In some embodiments, a media player or portable media device may create playlists based on information associated with content that includes one or more of title information, size information, date information, genre information, album information, artist information, or the like. The media player may obtain the information from metadata or from other sources, such as the Internet. In further embodiments, a user may interact with the media player to specify who much of the automatically determined content to be added to a playlist. The media player may received a weighting value associated with the determined content. The media player then may generate a playlist with portions or selections of the automatically determined content obtained in response to the weighting value.

In still further embodiments, a media player or portable media device may modify or update existing playlists. The media player may mix automatically determined content into one or more pre-existing playlist. The mixing may occur automatically or in response to a user interacting with the media player to specifying what content and how much to add, and which playlists to update. In some embodiments, the media player may provide an auditory or visual indication to the user conveying what content and how much content has been added to a playlist.

In still further embodiments, a media player or portable media device may include a media library. The media player may automatically determining additional content to add to a playlist based on information associated with a song, movie, image, the like, in response to querying the media library using on the information. In some embodiments, the media player may construct playlists as nested playlists.

A further understanding of the nature and the advantages of the inventions disclosed herein may be realized by reference of the remaining portions of the specification and the attached drawings.

BRIEF DESCRIPTION OF THE DRAWINGS

In order to better describe and illustrate embodiments and/or examples of those inventions disclosed herein, reference may be made to one or more accompanying drawings. The additional details or examples used to describe the accompanying drawings should not be considered as limitations to the scope of any of the disclosed inventions, the presently described embodiments and/or examples, and the presently understood best mode of these inventions.

DETAILED DESCRIPTION OF THE INVENTION

In various embodiments, an electronic device, such as a media player or portable media device, can include features directed to advanced playlist creation. For example, a user may interact with a media player to select content, playlists, or other media assets. The media player may obtain information about the selection, and use that information to procure additional content or other media assets that the user would likely find interesting. Based on metadata or other information associated with songs, movies, podcasts, photos, or other media assets, the media player may automatically procure additional content for the user. The media player may create or modify playlists with the discovered content.

Figure 1:
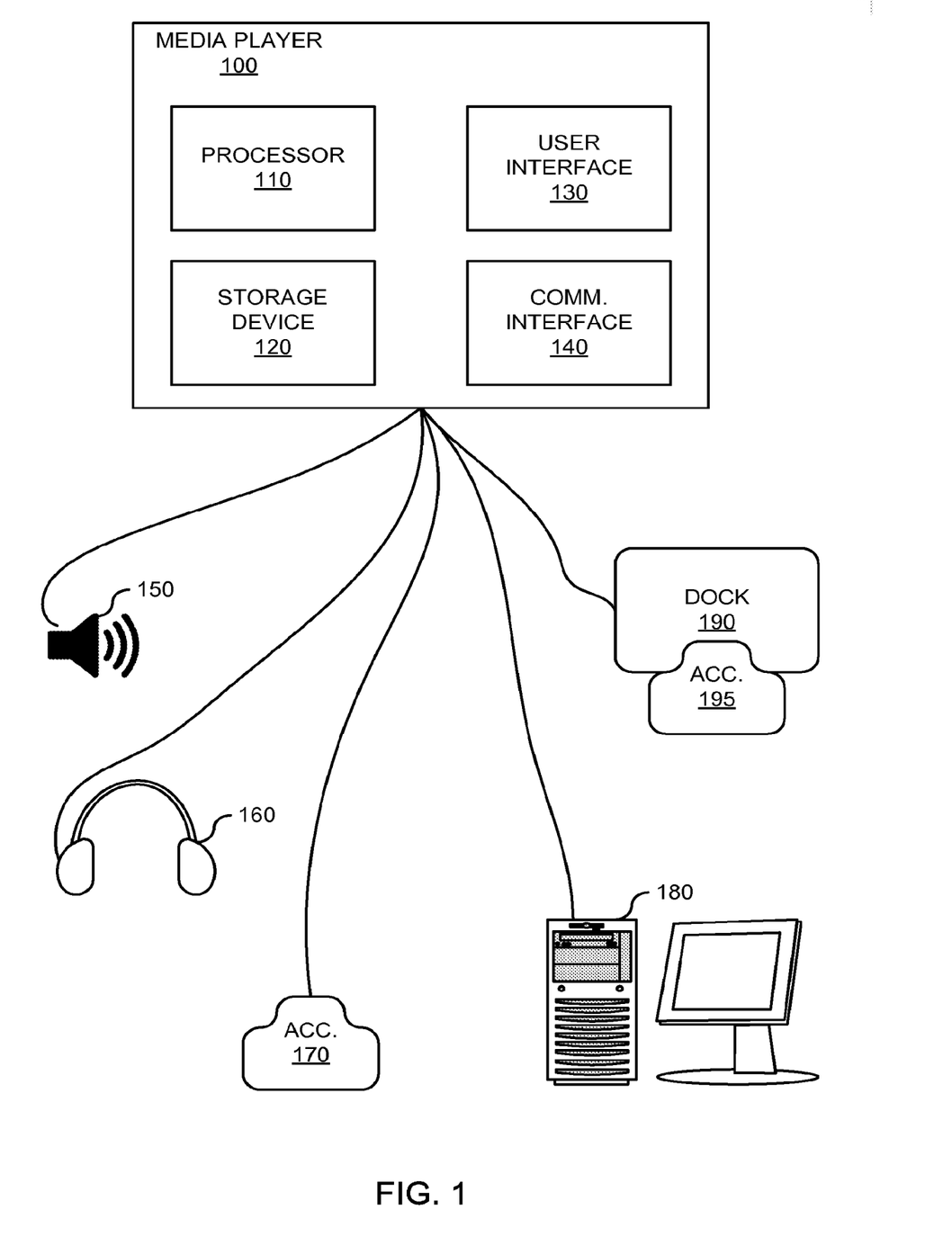
FIG. 1 is a block diagram of a media player that may incorporate embodiments of the present invention.

FIG. 1 is a block diagram of media player 100 that may incorporate embodiments of the present invention. In general, a media player stores content and/or media assets, such as audio tracks, movies, or photos that can be played or displayed on the media player. One example of media player 100 can be the iPod® media player, which is available from Apple, Inc. of Cupertino, Calif. Another example of media player 100 can be a personal computer, such as a laptop or desktop.

In this example, media player 100 includes processor 110, storage device 120, user interface 130, and communications interface 140. Processor 110 can control various functionalities associated with media player 100. Media play 100 may output audio content, video content, image content, and the like. Media player 100 may also output metadata or other information associated with content, such as track information and album art.

Typically, a user may load or store content onto media player 100 using storage device 120. Storage device 120 can include read-only memory (ROM), random access memory (RAM), non-volatile memory, flash memory, floppy disk, hard disk, or the like. A user may interact with user interface 130 of media player 100 to view or consume content. Some examples of user interface 130 can include buttons, click wheels, touch pads, displays, touch screens, and other input/output devices.

Media player 100 can include one or more connectors or ports that can be used to load content, retrieve content, interact with applications running on media player 100, interface with external devices, and the like. In this example, media player 100 includes communications interface 140. Some examples of communications interface 140 can include universal serial bus (USB) interfaces, IEEE 1394 (or FireWire/iLink®) interfaces, universal asynchronous receiver/transmitters (UARTs), wired and wireless network interfaces, transceivers, and the like. Media player 100 may connect to devices, accessories, private and public communications networks (e.g., the Internet), or the like, using communications interface 140.

In one example, media player 100 can be coupled via a wired and/or wireless connector or port to output audio and/or other information to speakers 150. In another example, media player 100 may be coupled via a wired and/or wireless connector or port to output audio and/or other information to headphones 160. In yet another example, media player 100 may be coupled via a wired and/or wireless connector or port to interface with an accessory 170 or a host computer 180. The same connector or port may enable different connections at different times.

Media player 100 can be physically inserted into docking system 190. Media player 100 may be coupled via a wired and/or wireless connector or port to interface with docking system 190. Docking system 190 may also enable one or more accessory devices 195 to couple with wires or wirelessly to interface with media player 100. Many different types and functionalities of accessory devices 170 and 195 can interconnect to or with media player 100. For example, an accessory may allow a remote control to wirelessly control media player 100. As another example, an automobile may include a connector into which media player 100 may be inserted such that an automobile media system can interact with media player 100, thereby allowing media content stored on media player 100 to be played within the automobile.

In various embodiments, media player 100 can receive content or other media assets from a computer system (e.g., host computer 160). The computer system may serve to enable a user to manage media assets stored on the computer system and/or stored on media player 100. As an example, communications interface 140 may allow media player 100 to interface with host computer 160. Host computer 160 may execute a media management application to manage media assets, such as loading songs, movies, photos, or the like, onto media player 100. The media management application may also create playlists, record or rip content, schedule content for playback or recording, or the like. One example of a media management application can be iTunes®, produced by Apple, Inc. of Cupertino, Calif.

In various embodiments, media player 100 can provide a user with the ability to automatically create playlists. For example, a user may select a song, and media player 100 may create or modify playlists based on information, such as the song's title, the song's artist, the album associated with the song, a genre, or the like associated with the song. Media player 100 may create the playlist, for example, using a nested playlist query with information provided by the user or other information obtained by media player 100.

In a further example, assume a user desires to discover music based on genres, such as rock, jazz, and R&B. Media player 100 may automatically populate a playlist using a combination of songs obtained from a media library that are associated with the rock, jazz, and R&B genres. A user may further interact with media player 100 to provide values for determining how much of the content or other media assets procured by media player 100 should be added or mixed into a playlist. The user may specify, for example, the percentage of songs of each genre or the number of movies in each genre that media player 100 should use to create a playlist or mix into an existing playlist.

Figure 2:
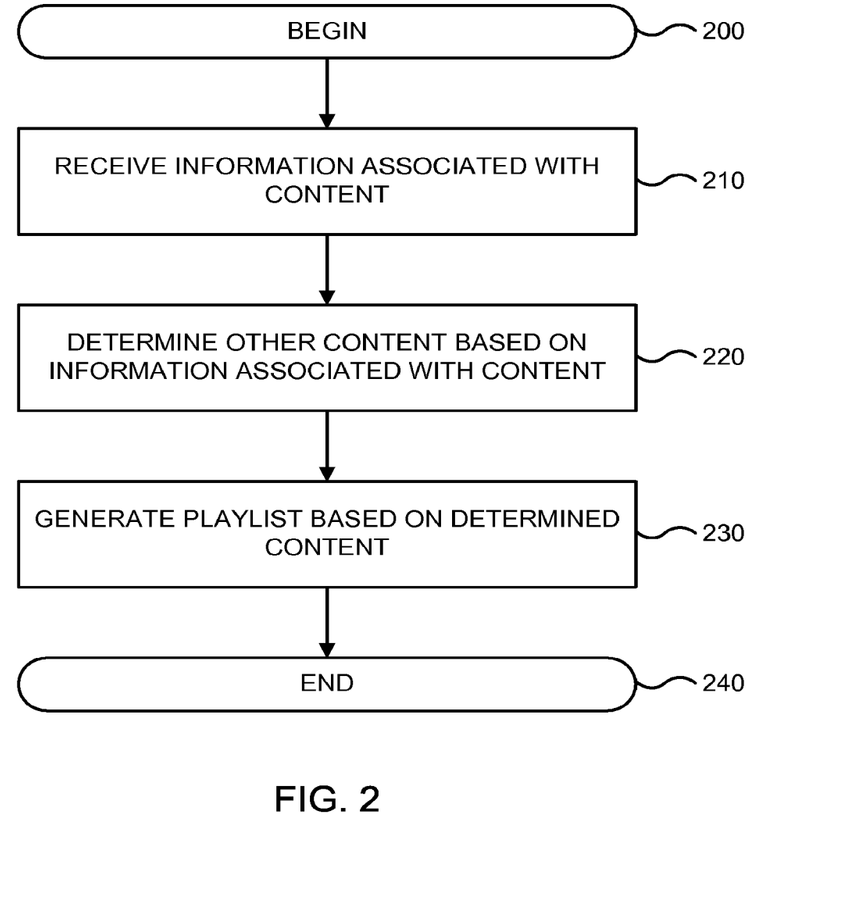
FIG. 2 is a simplified flowchart of a method for generating a playlist in one embodiment according to the present invention.

FIG. 2 is a simplified flowchart of a method for generating a playlist in one embodiment according to the present invention. The processing depicted in FIG. 2 may be performed by software modules (e.g., instructions or code) executed by a processor of a computer system, by hardware modules of an electronic device, or combinations thereof. FIG. 2 begins in step 200.

In step 210, information associated with content is received. For example, media player 100 may receive input from a user indicative of a title, artist, album, genre, sub-genre, date when content was released/published, decade when content was made available, and/or other information associated with content. A user may interact with media player 100 to select one or more songs, photos, images, movies, motions picture sequences, playlists, or the like, from which the information may be determined. In some embodiments, one or more keywords or search terms may be received that may be used to match metadata associated with content or other media assets.

In step 220, other content is determined based on the information associated with content. The other content may include songs, movies, photos, or the like having a relationship with the content. For example, the other content may be related by album, artists, director, theme, genera, era, tags, popularity, rank, acoustics, visual data, location, or the like. In one example, media player 100 queries a content database to determine other content based on the information associated with the content. Media player 100 may generate a nested playlist query that includes other playlists to determine content.

Media player 100 may determine songs, for example, that have been written by the same artist as a song selected by the user. Media player 100 may further determine songs, for example, that have been manually or automatically categorized into the same or substantially similar genre as a song selected by the user. Media player 100 may further determine playlists, for example, that include a substantial majority of songs or other content that are indicative of the information associated with the content selected by the user. Media player 100 may further determine movies, for example, that have been released during a particular time period or decade.

In step 230, a playlist is generated based on the determine content. In general, a playlist may include a list of content, such as songs. The playlist may define the order of the content in the list. The playlist may also include or define other playlists. Continuing one of the previous examples, media player 100 may generate a playlist based on the query results returned from a query to a content database. Media player 100 may further generate the playlist based on the items of other playlists. Media player 100 may create new playlists, or update or modify existing playlists, for example, using nested playlists. FIG. 2 ends in step 240.

Accordingly, a media player or portable media device may allow a user to quickly discover and initiate playback of content or other media assets. Based on information about content, a media player may use an advanced playlist creation technique to automatically procure and present to a user content or other media assets that a user likely desires. The user may interact with the media player to create playlists of various sizes by selecting, for example, a single song. For example, a user may interact with media player 100 to specify the proportions or percentages of content that has been automatically procured for addition to a playlist.

Figure 3:
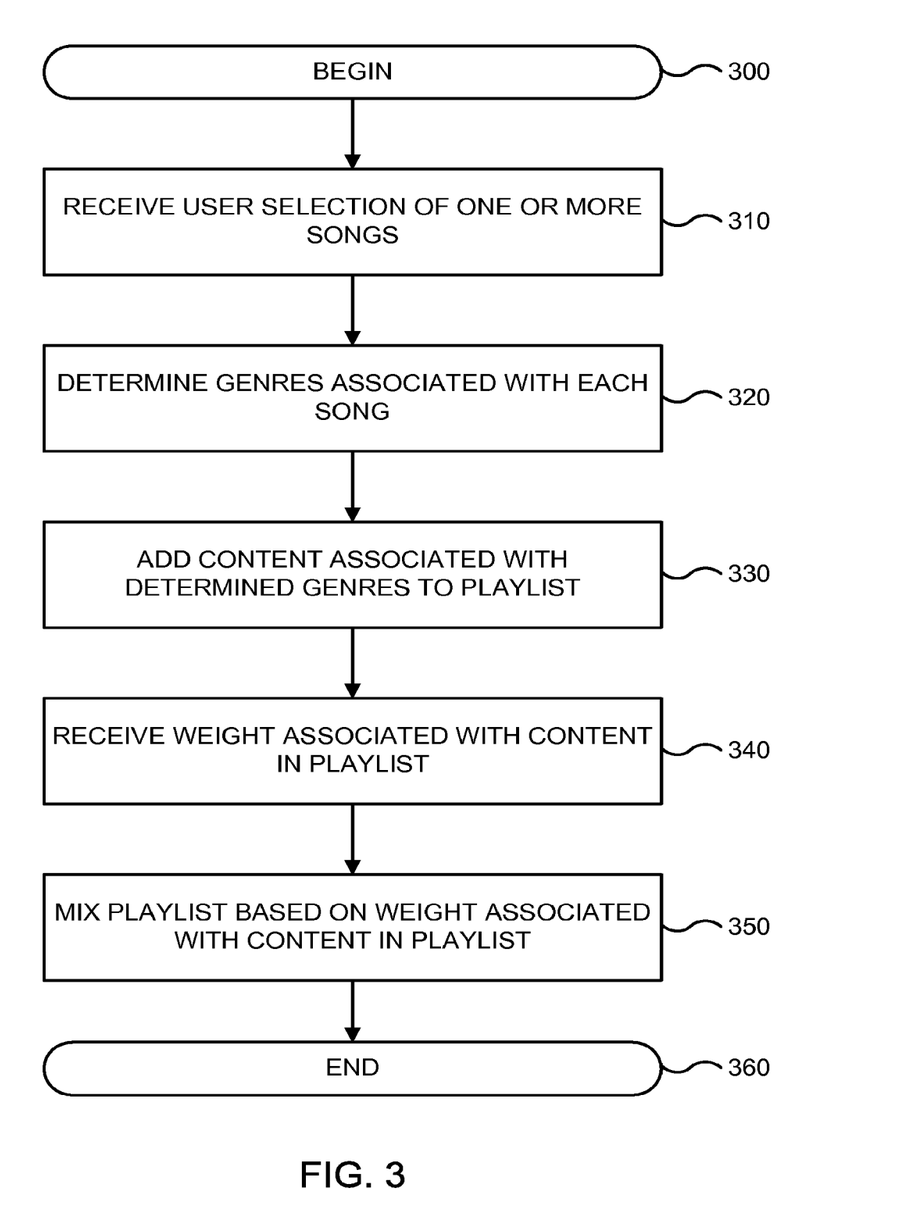
FIG. 3 is a flowchart of a method for generating a playlist based on information associated with one or more songs in one embodiment according to the present invention.

FIG. 3 is a flowchart of a method for generating a playlist based on information associated with one or more songs in one embodiment according to the present invention. FIG. 3 begins in step 300.

In step 310, user selection of one or more songs is received. For example, a user may interact with a graphical user interface to select the one or more songs. The user may interact with a click-wheel, touchscreen, pen-based apparatus, or the like to select songs to which the user is interested in listening. The one or more songs may be stored on media player 100 in a media or content library. The songs may also accessible via a communications network, such as the Internet. In another example, the user may interact with a playlist to select the one or more songs. In a still further example, the user may identify songs from a plurality of songs listed in response to a search based on artist, album, genre, keyword, or the like.

In step 320, genres associated with each of the one or more songs are determined. For example, media player 100 may consult the content library to determine the genres associated with the one or more songs. In another example, media player 100 may extract information associated with a genre from a file stored on media player 100 that may also store audio information representing the song (e.g., MP3 ID tag). Some examples of genres associated with music are classical, country, rock, jazz, R&B, funk, salsa, and the like. Some examples of genres associated with movies are drama, horror, comedy, animation, and the like.

In step 330, content associated with the determined genres is added to a playlist. In one example, media player 100 may search a content or media library for content that matches or is substantially similar to the determined genres. Media player 100 may then create a new playlist, and add the content to the newly created playlist. Media player 100 may append the content to the bottom of a playlist. In another example, media player 100 may mix the content associated with the determined genres into an existing playlist. In yet another example, media player 100 may insert a playlist of the determined content into another playlist as a nested playlist.

In step 340, a weight (e.g., a weighting value) associated with the content in the playlist is received. The weight can include information associated with a value, percentage, selection, or the like. For example, a user may input a maximum number of songs for a particular genre that the user wants organized in the playlist. In another example, the user may allocate each genre a percentage such that songs for a particular genre are organized within the playlist based on a corresponding percentage. In a still further example, the user may provide a score associated with a particular artist. Media player 100 then may use the score to determine a preference associated with how much of the artist's content can be organized in the playlist. Other types of weighting values, percentages, rankings, tags, or the like, may be used to determine the proportions, arrangement, order, mix, and organization of determine content in the playlist.

In step 350, the playlist is mixed based on the weight associated with the content in the playlist. For example, media player 100 may organize songs in the playlist, remove songs, add additional songs, or the like, based on the weights. While the example above illustrates organizing the songs subsequent to adding the content to a playlist, the playlist may be automatically created after a user provides the type and how much content should be added to the playlist. FIG. 3 ends in step 360.

Figure 4:
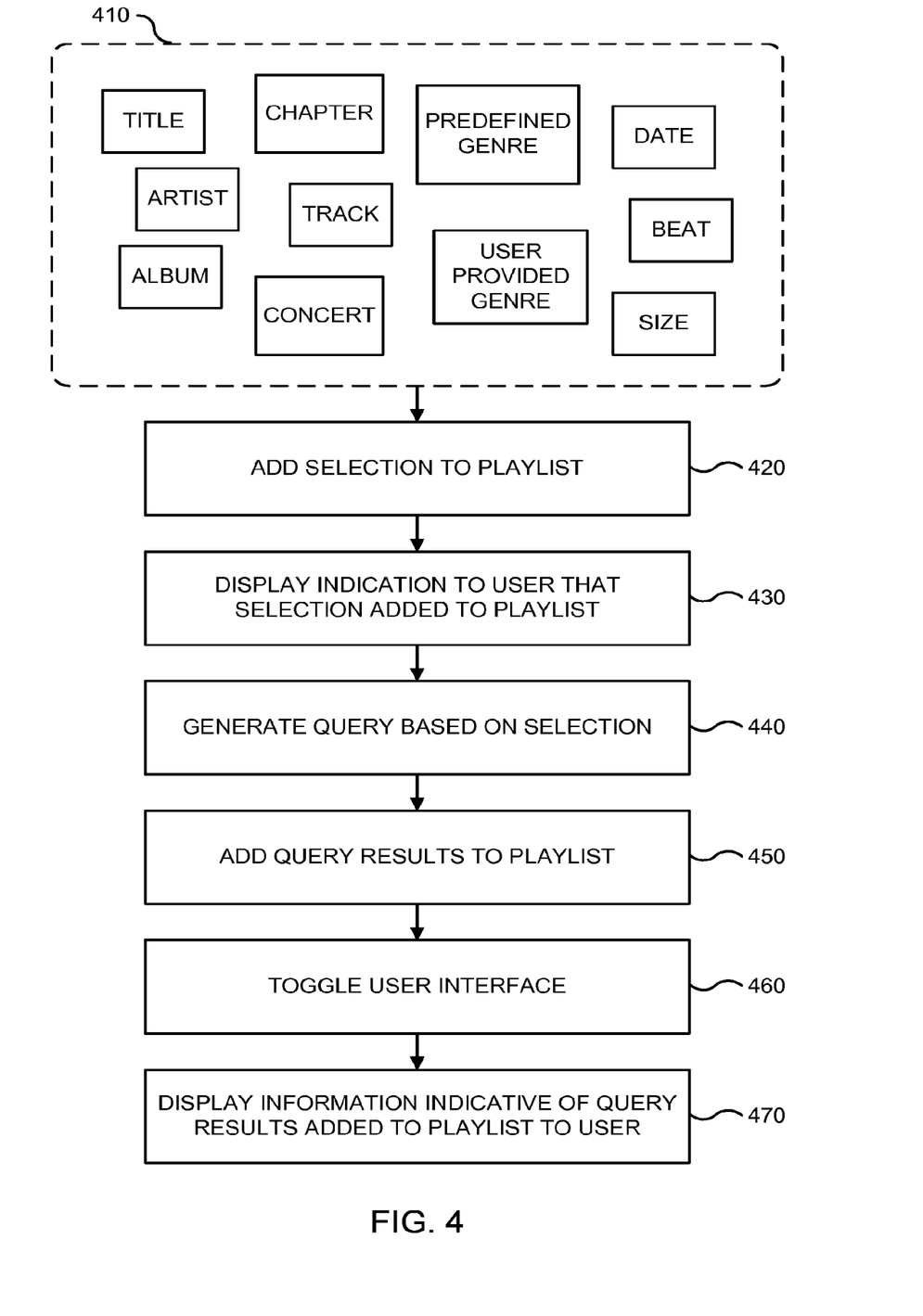
FIG. 4 is a block diagram illustrating playlist generation in one embodiment according to the present invention.

FIG. 4 is a block diagram illustrating playlist generation in one embodiment according to the present invention. In this example, information associated with content in block 410 can include title information, artist information, album information, chapter information, track information, concert information, predefined genre information, user provided genre information, date information, beat information, size information, or the like.

In various embodiments, a user may select or otherwise identify one or more items of information in block 410. The selection may then be added to a playlist in block 420. An indication may be displayed to the user that the selection has been added to the playlist in block 430. For example, a user may select a song by choosing the song's title when displayed on a screen of a media player or portable media device. An icon or graphic may be displayed next to the song's title on the screen indicating that the song has been added to a playlist, such as an "On-The-Go" playlist.

In some embodiments, for example, if the title of a song has been selected, media player 100 then may immediately add the song to a playlist. In another example, media player 100 merely provides an indication to the user that the selection has been added to a playlist and defers actually adding content to the playlist to a later stage. In yet another example, media player 100 may commence playing of the selection to the user.

A query may be generated based on information associated with the selection in block 440. For example, media player 100 may commence playback of a song selected by the user, and thereafter generate the query to determine other songs whose titles have similar keywords to the words in the title of the selected song. In another example, media player 100 may generate a query to determine other songs that are classified in a similar or substantially similar genre as the selected song. Media player 100 may also generate a query to determine other songs, images, photos, movies, or other content stored by media player 100 that satisfy a set of criteria based on attributes in the information of the selected song.

The query results may be added to a playlist in block 450. For example, media player 100 may add or append songs written and/or associated with the artist of the selected song/content to the current playlist or the "On-The-Go" playlist. In another example, media player 100 may add all songs within a given genre determined to a new playlist. Media player 100 may initiate playback of items in the new playlist after playback of the current selection.

In various embodiments, a graphical user interface may be toggled in block 460. For example, media player 100 may update a graphical user interface to reflect the content that has been added to the playlist. Media player 100 may switch between one or more windows or update a portion of a window. Information indicative of the query results added to the playlist may be displayed in block 470. Media player 100 may generate one or more visual representations of content in the playlist, such as lists, graphs, bar charts, pie charts, or the like. A user may interact with the visual representation to prune content, distribute automatically procured content within the playlist based on one or more criteria, or the like.

Figure 5A:
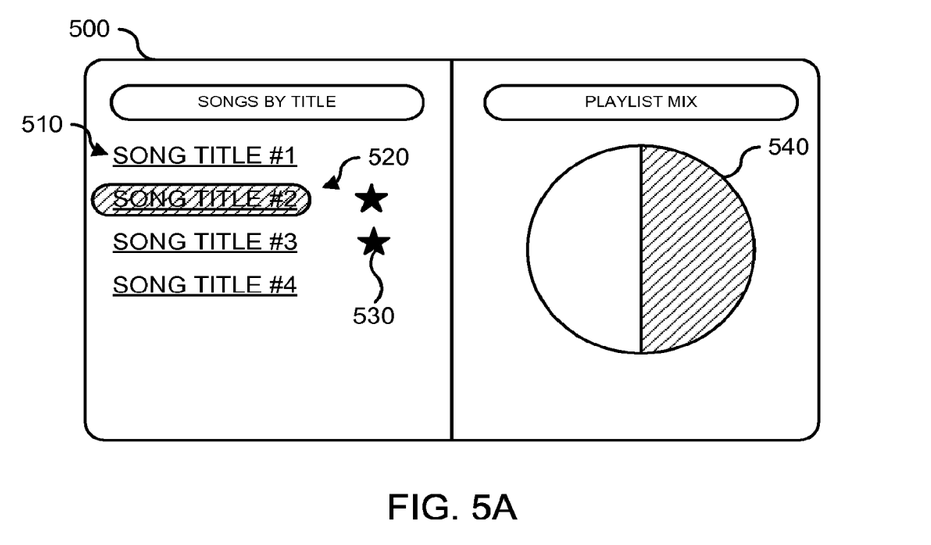
FIGS. 5A and 5B are sample graphical user interfaces (GUIs) in one embodiment according to the present invention.
Figure 5B:
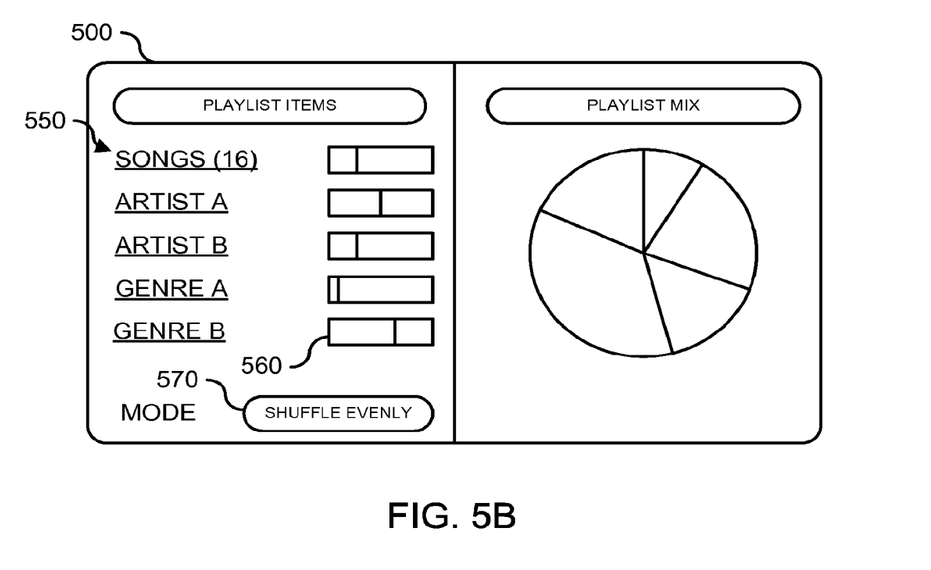

FIGS. 5A and 5B are sample graphical user interfaces (GUIs) 500 in one embodiment according to the present invention. Referring to FIG. 5A, graphical user interface 500 can include a left-hand pane and a right-hand pane. The left-hand pane may include objects or widgets that allow the user to interact with graphical user interface 500. A right-hand pane may include data, information, and the like that visually outputs information to the user. In one example, the left-hand pane may include elements of graphical user interface 500 that are dynamic in response to user input. In another example, the right-hand pane may include elements of graphical user interface 500 that are static based on user interactions in the left pane.

List 510 may be displayed within graphical user interface 500. List 510 may include information indicative of content automatically procured by media player 100. In this example, list 510 can include the titles of one or more songs. List 510 may include other items or representations associated with attributes in information associated with content or other media assets, such as those items listed in the information associated with content in block 410 of FIG. 4. In some embodiments, a user may highlight or otherwise select one or more items of content, or representations of content, in list 510. For example, the user may select one of the song titles as indicated by selection area 520. Graphical user interface 500 may further include one or more visualizations or indications that the content has been added to the playlist. In this example, one or more stars 530 are displayed to the right of the titles of songs that have been added to the playlist. In another example, graphical user interface 500 may include an indicator that represents the name of the playlist (or the playlist's abbreviation) to which the selected content has been added.

In some embodiments, graphical user interface 500 can include a visualization 540 that indicates information associated with content selected by the user that has been added to the playlist. For example, visualization 540 may include a pie chart indicating that a first set songs represents 50% of a playlist, and a second set of songs represents the remaining 50% of the playlist. In another example, visualization 540 may include a bar chart indicating the total number of songs associated with each genre represented in the playlist.

Referring now to FIG. 5B, in some embodiments, graphical user interface 500 can include a list of items organized with in the playlist. For example, list 550 may illustrate items organized within the playlist by number, genre, artist, or the list. An item in list 550 may include a representation of a song, movie, photo, image, and the like, a representation of an artist, album, genre, and the like. For example, an image or icon representing a musical note may be used to represent individual songs that have been added to the playlist. In another example, an image or icon representing a painter's palette may be used to represent items associated with an artist. An image or icon representing a guitar, saxophone, or other musical instrument may be used to represent a particular genre. An image or icon representing a record, CD, DVD, or movie camera may be used to represent an album, DVD, or movie/motion picture sequence.

In some embodiments, widget 560 of graphical user interface 500 may allow a user to set or establish a weighing value associated with a particular item in list 550. For example, widget 560 may be a slider bar that represents a value in response to the position of the slider bar. In another example, widget 560 may be a text box in which a user may enter a particular value.

In some examples, a user can manipulate widget 560 to establish the number of songs to be added to a playlist. Widget 560 may be manipulated to provide the portion/percentage of an artist or genre or other item in list 550 that should be mixed into the playlist. For example, a user may indicate that 25% of content to be added into the playlist from any content automatically procured from a selection should include content associated with "Artist A." The user may indicate that another 15% of content to be added into the playlist from any content automatically procured from a selection should include content associated with "Artist B."

Accordingly, the user of a media player or portable media device may not have to individually select all of the content associated with "Artist A" or "Artist B" for playback. Based on the weighting values, media player 100 may automatically retrieve, portion, and mix content associated with "Artist A" or "Artist B" to be played according to the playlist. Graphical user interface 500 may update visualization 540 based on the weighting values associated with each item.

In various embodiments, a user may select a mode using widget 570. The mode may include information or instructions that indicate to a media player or portable media device how to organize content within the playlist for playback. For example, media player 100 may output content randomly, according to a predetermined list, according to a preference provided by the user or a tagging system, and the like.

Figure 6:
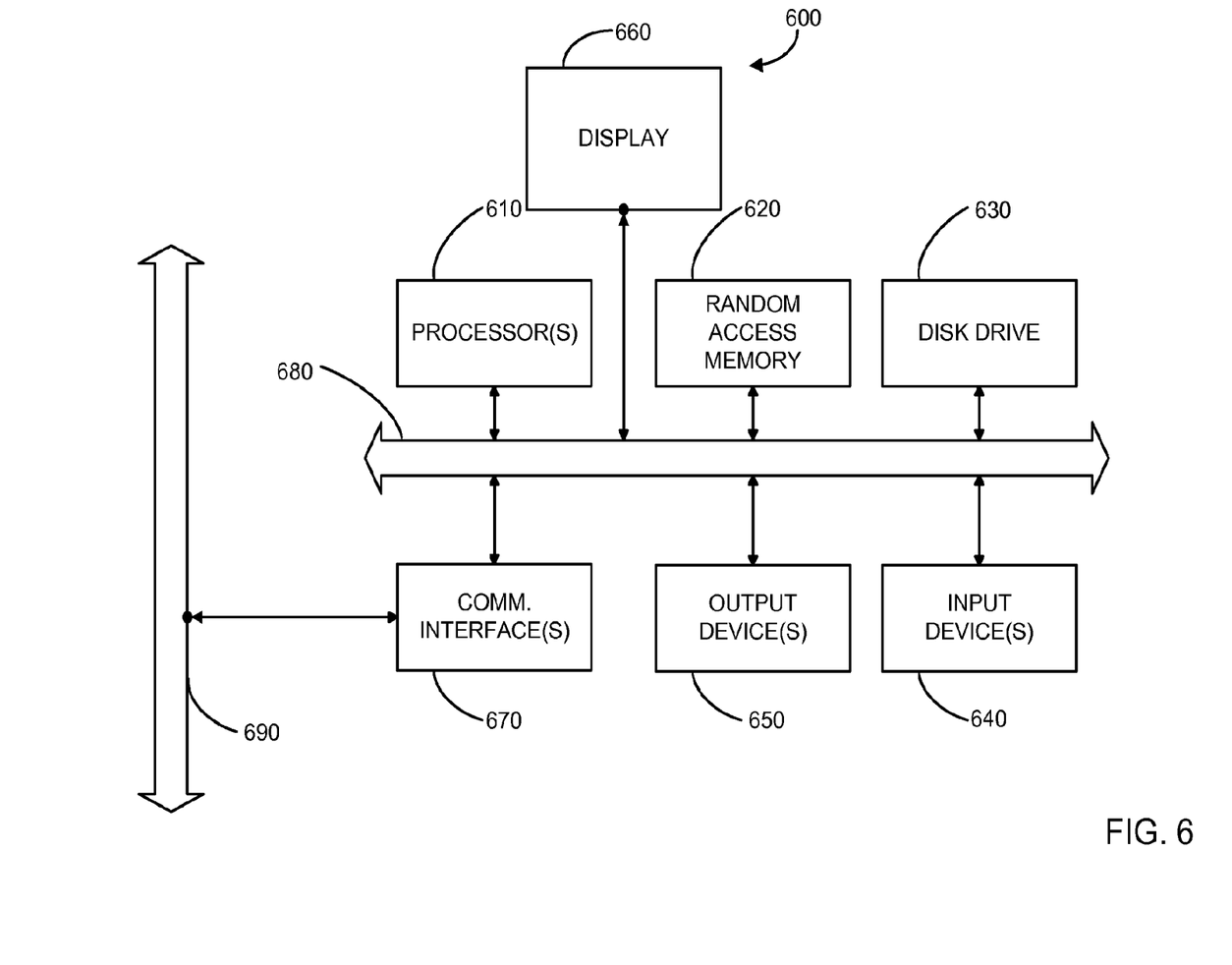
FIG. 6 is a simplified block diagram of a computer system that may incorporate embodiments of the present invention.

FIG. 6 is a simplified block diagram of a computer system 600 that may incorporate embodiments of the present invention. FIG. 6 is merely illustrative of an embodiment incorporating the present invention and does not limit the scope of the invention as recited in the claims. One of ordinary skill in the art would recognize other variations, modifications, and alternatives.

In one embodiment, computer system 600 includes processor(s) 610, random access memory (RAM) 620, disk drive 630, input device(s) 640, output device(s) 650, display 660, communications interface(s) 670, and a system bus 680 interconnecting the above components. Other components, such as file systems, storage disks, read only memory (ROM), cache memory, codecs, and the like may be present.

RAM 620 and disk drive 630 are examples of tangible media configured to store data such as audio, image, and movie files, operating system code, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, input device 640 is typically embodied as a computer mouse, a trackball, a track pad, a joystick, a wireless remote, a drawing tablet, a voice command system, an eye tracking system, a multi-touch interface, a scroll wheel, a click wheel, a touch screen, an FM/TV tuner, audio/video inputs, and the like. Input device 640 may allow a user to select objects, icons, text, and the like, via a command such as a click of a button or the like. In various embodiments, output device 650 is typically embodied as a display, a printer, a force-feedback mechanism, an audio output, a video component output, and the like. Display 660 may include a CRT display, an LCD display, a Plasma display, and the like.

Embodiments of communications interface 670 may include computer interfaces, such as include an Ethernet card, a modem (telephone, satellite, cable, ISDN), (asynchronous) digital subscriber line (DSL) unit, FireWire interface, USB interface, and the like. For example, these computer interfaces may be coupled to a computer network 690, to a FireWire bus, or the like. In other embodiments, these computer interfaces may be physically integrated on the motherboard or system board of computer system 600, and may be a software program, or the like.

In various embodiments, computer system 600 may also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer system 600 may also include an operating system, such as Microsoft Windows®, Linux®, Mac OS X®, real-time operating systems (RTOSs), open source and proprietary OSs, and the like.

FIG. 6 is representative of a media player and/or computer system capable of embodying the present invention. It will be readily apparent to one of ordinary skill in the art that many other hardware and software configurations are suitable for use with the present invention. For example, the media player may be a desktop, portable, rack-mounted or tablet configuration. Additionally, the media player may be a series of networked computers. Moreover, the media player may be a mobile device, an embedded device, a personal digital assistant, a smartphone, and the like. In still other embodiments, the techniques described above may be implemented upon a chip or an auxiliary processing board.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for generating playlists using an electronic device, the method comprising:
   receiving, by the electronic device, a selection of a first media item;
   determining, by the electronic device, a plurality of metadata attributes associated with the first media item;
   generating, by the electronic device, a playlist comprising a first plurality of media items based on the plurality of metadata attributes associated with the first media item;
   displaying, by the electronic device, a plurality of user operable controls that are each associated with a metadata attribute from the plurality of metadata attributes, wherein the plurality of user operable controls describe: i) a media content type, and ii) a number of media items of the media content type;
   receiving, by the electronic device, i) a first input from the plurality of user operable controls, wherein the first input indicates a media content type value, and ii) a second input from the plurality of user operable controls, wherein the second input indicates a media item number, and the media item number is a maximum number of media items of the media content type value to be added to the playlist; and
   updating, by the electronic device, the playlist to include a second plurality of media items selected based on the media content type value and the media item number.

2. The method of claim 1, wherein the plurality of metadata attributes includes at least one of title information, size information, date information, genre information, album information, or artist information.

3. The method of claim 1, further comprising:
   generating, by the electronic device, an indication informing a user that the playlist is updated.

4. The method of claim 1, wherein the playlist comprises a nested playlist.

5. The method of claim 1, further comprising:
displaying, on the electronic device, a chart indicative of a composition of the playlist; and
dynamically updating, by the electronic device, the chart in response to a particular input received via operation of any of the plurality of user operable controls to indicate a new composition of the playlist based on the first and second inputs.

6. The method of claim 5, wherein the chart includes an indication of a total number of media items associated with each metadata attribute that are included in the playlist.

7. An electronic device comprising:
a processor;
a user interface coupled to the processor; and
a memory configured to store a set of instructions which when executed by the processor causes the processor to:
receive a selection of a first media item;
determine a plurality of metadata attributes associated with the first media item;
generate a playlist comprising a first plurality of media items based on the plurality of metadata attributes associated with the first media item;
display a plurality of user operable controls that are each associated with a metadata attribute from the plurality of metadata attributes, wherein the plurality of user operable controls describe: i) a media content type, and ii) a number of media items of the media content type;
receive: i) a first input from the plurality of user operable controls, wherein the first input indicates a media content type value, and ii) a second input from the plurality of user operable controls, wherein the second input indicates a media item number, and the media item number is a maximum number of media items of the media content type value to be added to the playlist; and
update the playlist to include a second plurality of media items selected based on the media content type value and the media item number.

8. The electronic device of claim 7, wherein the plurality of metadata attributes includes at least one of title information, size information, date information, genre information, album information, or artist information.

9. The electronic device of claim 7, wherein the set of instructions further cause the processor to:
generate an indication informing a user that the playlist is updated.

10. The electronic device of claim 7, wherein the playlist comprises a nested playlist.

11. The electronic device of claim 7, wherein the set of instructions further cause the processor to:
display a chart indicative of a composition of the playlist; and
dynamically update the chart in response to a particular input received via operation of any of the plurality of user operable controls to indicate a new composition of the playlist based on the particular input.

12. The electronic device of claim 11, wherein the chart includes an indication of a total number of media items associated with each metadata attribute that are included in the playlist.

13. The electronic device of claim 7, wherein the user interface comprises a touch screen.

14. The electronic device of claim 7, further comprising:
a communication interface coupled to the processor.

15. A non-transitory computer-readable medium storing instructions that, when executed by one or more computer processors of a computing device, cause the computing device to:
receive a selection of a first media item;
determine a plurality of metadata attributes associated with the first media item;
generate a playlist comprising a first plurality of media items based on the plurality of metadata attributes associated with the first media item;
display a plurality of user operable controls that are each associated with a metadata attribute from the plurality of metadata attributes, wherein the plurality of user operable controls describe: i) a media content type, and ii) a number of media items of the media content type;
receive: i) a first input from the plurality of user operable controls, wherein the first input indicates a media content type value, and ii) a second input from the plurality of user operable controls, wherein the second input indicates a media item number, and the media item number is a maximum number of media items of the media content type value to be added to the playlist; and
update the playlist to include a second plurality of media items selected based on the media content type value and the media item number.

16. The non-transitory computer-readable medium of claim 15, wherein the plurality of metadata attributes includes at least one of title information, size information, date information, genre information, album information, or artist information.

17. The non-transitory computer-readable medium of claim 15, the instructions further causing the computing device to:
generate an indication informing a user that the playlist is updated.

18. The non-transitory computer-readable medium of claim 15, wherein the playlist comprises a nested playlist.

19. The non-transitory computer-readable medium of claim 15, the instructions further causing the computing device to:
display a chart indicative of a composition of the playlist; and
dynamically update the chart in response to a particular input received via operation of any of the plurality of user operable controls to indicate a new composition of the playlist based on the first and second inputs.

20. The non-transitory computer-readable medium of claim 19, wherein the chart includes indication of a total number of media items associated with each metadata attribute that are included in the playlist.

* * * * *